United States Patent [19]

Buchanan, Jr. et al.

[11] 4,398,704

[45] Aug. 16, 1983

[54] VEHICLE PNEUMATIC SUSPENSION SYSTEM WITH DEAD BAND ADJUSTMENT

[75] Inventors: Harry C. Buchanan, Jr., Spring Valley; Donald E. Graham, Centerville; Keith R. Cook, Xenia; George T. Claude, Bellbrook, all of Ohio

[73] Assignee: General Motors Corporation, Detroit, Mich.

[21] Appl. No.: 342,676

[22] Filed: Jan. 26, 1982

Related U.S. Application Data

[63] Continuation of Ser. No. 57,793, Jul. 16, 1979, abandoned.

[51] Int. Cl.³ .............................................. F16F 9/50
[52] U.S. Cl. .......................... 267/64.21; 280/DIG. 1; 280/707; 338/32 H
[58] Field of Search ................. 280/704, 707, DIG. 1; 267/64.16, 64.18, 64.19, 64.21, 64.28; 338/32 H

[56] References Cited

U.S. PATENT DOCUMENTS

| | | | |
|---|---|---|---|
| 2,361,575 | 10/1944 | Thompson | 267/64.19 |
| 3,199,630 | 8/1965 | Engel et al. | 187/29 F |
| 3,524,634 | 8/1970 | Schmidt | 267/64.16 |
| 3,582,106 | 6/1971 | Keijzer | 267/64.19 X |
| 3,752,039 | 8/1973 | Hewins | 60/390 X |
| 4,054,295 | 10/1977 | Elliott | 280/707 X |
| 4,310,172 | 1/1982 | Claude et al. | 280/707 X |

FOREIGN PATENT DOCUMENTS 1205714   9/1970   United Kingdom ................. 91/390

Primary Examiner—George E. A. Halvosa
Attorney, Agent, or Firm—Charles R. White

[57] ABSTRACT

Pneumatic suspension system for automotive application in which sprung and unsprung masses are supported by variable volume air spring units and incorporating compressor and exhaust valve devices for supplying an exhausting pressurized air from the units to adjust the height between the masses. A Hall effect device effective across a pressure boundary senses the position of a magnet movable within one of the air spring units and reflects relative movement of the sprung and unsprung masses to effect control of the supply and exhaust of air from the units. By axial movement of the Hall device, dead band width can be established to accommodate normal ride motions between sprung and unsprung components. By rotating the Hall device at any axial position, the vehicle bumper height can be selectively increased or decreased.

7 Claims, 5 Drawing Figures

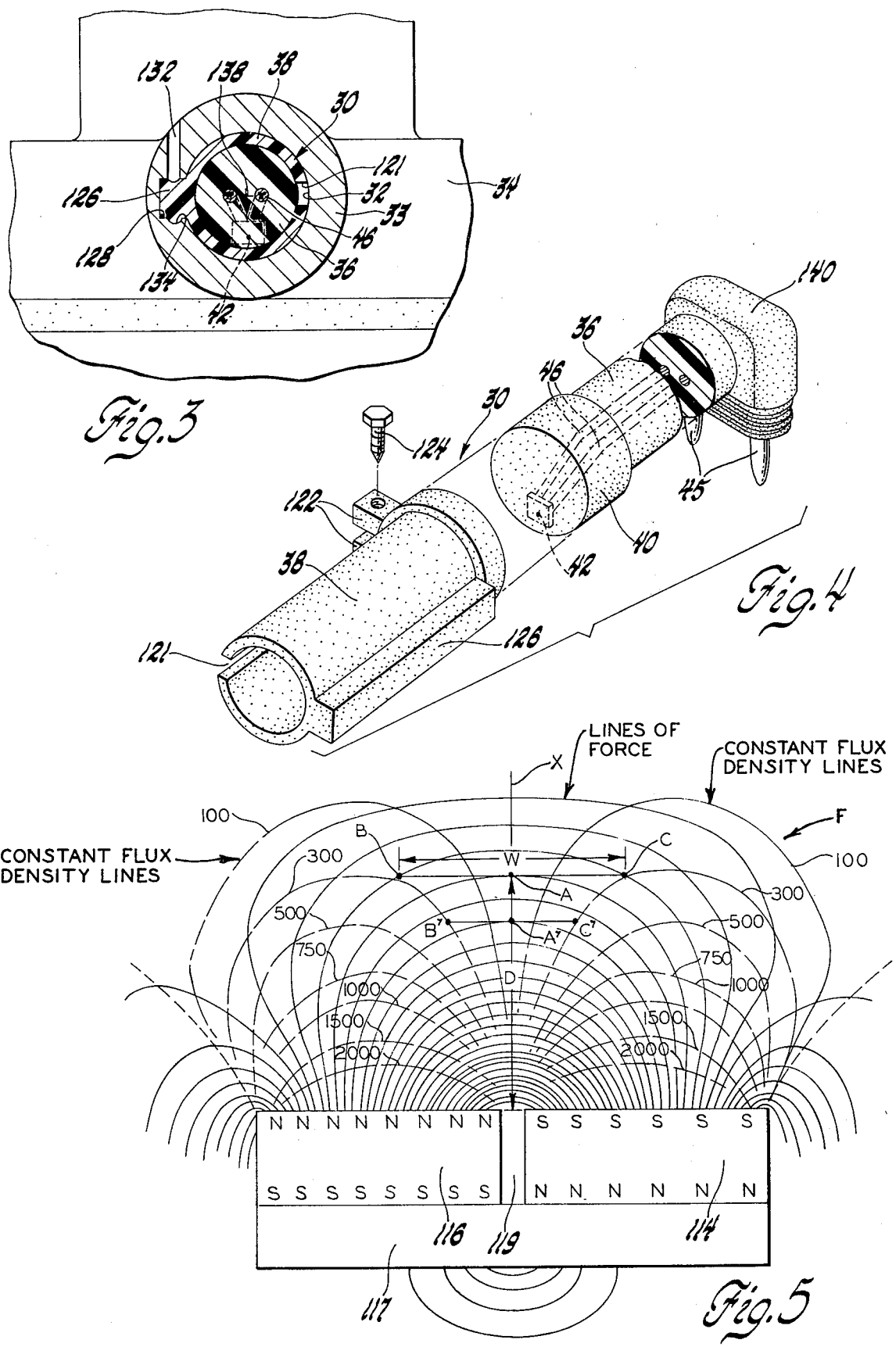

VEHICLE PNEUMATIC SUSPENSION SYSTEM WITH DEAD BAND ADJUSTMENT

This is a continuation of application Ser. No. 057,793, filed July 16, 1979, now abandoned.

This invention relates to vehicle suspensions and more particularly a new and improved pneumatic suspension system for vehicles featuring automatic height adjustment to a predetermined dead band zone the width of which may be selectively increased or decreased and further providing for adjustment of vehicle bumper height through pneumatic suspension units.

Prior to the present invention, various leveling systems have been employed to adjust the trim height of a vehicle by varying the distances between the sprung and unsprung vehicle masses. With such systems a wide range of load and load distributions can be handled with improved stability and operating characteristics imparted to the vehicle. In some of these systems air adjustable shock absorbers have been employed with mechanical suspension springs. With appropriate control over the supply and exhaust of air to and from the air adjustable shock absorbers the spring rate of the suspension springs can be adjusted to adjust vehicle trim height in accordance with load distributions. While these prior systems have been generally satisfactory and have successfully met prior needs, they often added to overall vehicle weight and thus have not contributed to the meeting of new automotive standards for improved fuel efficiency requiring reductions in vehicle weight. In contrast to the prior systems, the present invention provides a lightweight suspension system for a wide range of vehicles and particularly for vehicles that experience substantial increase in proportional load differences on the vehicle suspension comparing loaded and unloaded conditions.

In this invention there is a new and improved height signaling device which is employed within a pneumatic air spring that indicates the relative position between the sprung and unsprung masses of the vehicle. A sensing device external of the envelope provided by the air spring picks up the signal and transmits information to an electronic module preferably mounted on a compressor remote from the air spring unit. The compressor supplies pressurized air to the air spring to increase the distance between the sprung and unsprung masses. In the event that the height between the sprung and unsprung masses exceeds a predetermined limit, the sending unit on the air spring damper will effect energization of an exhaust valve to reduce the distance between the sprung and unsprung masses.

In particular, this invention utilizes an externally mounted Hall effect device near a magnet movably mounted within the pressure envelope of a pneumatic suspension spring to proportionally reflect movement between sprung and unsprung vehicle masses so as to produce three states useful in the positioning sensing of a system. The Hall effect device provides outputs depending upon its position within the flux field of the magnets which trigger operation of controls to increase vehicle height if the vehicle trim height is low and to decrease vehicle height if trim height is high. If the Hall device is within a dead band or null zone of the field, the vehicle is in trim and no height control is required. This dead band zone prevents hunting and permits normal suspension spring operation of the pneumatic units. The internally mounted magnets preferably have a keeper on its back side for the purposes of intensifying the magnetic field to be sensed by the Hall effect device. The magnet and its keeper are attached to one part of the system and are moved in a vertical direction in response to and in portion to the relative movement of the sprung and unsprung masses.

Inasmuch as the Hall effect device is effected by movement with respect to the magnetic field, it may be laterally moved toward and away from the face of the magnets to vary dead band width. In addition to the lateral movement, the Hall effect device may be rotated in any laterally adjusted position to vertically position the Hall effect device in the field for alignment of the edge of the dead band and to thereby vary the bumper height of the vehicle. The lateral and rotational positioning of the Hall effect device with respect to the magnetic field provides improved control over the adjustment of the dead band width and bumper height. These components providing these adjustments may be fixed at a selected permanent or semi-permanent setting if desired or may be adjustable for subsequent quick readjustment if needed.

A feature object and advantage of this invention is to provide a new and improved lightweight pneumatic suspension system for vehicles that maintain high ride quality and further meet needs for passenger and luggage capacity within a small vehicle envelope.

Another feature object and advantage of this invention is to provide a new and improved level control system in which pneumatic air springs are employed for vehicle suspension which have a dead band that can be selectively varied in width to accommodate tolerance stack ups and other variations occurring in mass manufacture.

Another feature object and advantage of this invention is to provide a new and improved height control system in a pneumatic air suspension system for a vehicle in which a Hall effect device can be adjusted to provide a wide range of dead band widths and to further provide for alignment of the edge of the dead band and thereby adjustment in vehicle bumper heights.

It is another feature object and advantage of this invention to provide a new and improved pneumatic suspension system for a vehicle in which one component of a sensing unit is movably mounted internally of a pneumatic air spring suspension unit and has reduced movement proportional to the relative movement of sprung and unsprung vehicle masses and further in which a second component external of the pneumatic unit reacts to positioning of the first unit to generate signals for effecting changes in height between the masses.

Another feature object and advantage of this invention is to employ a helical spring in an air spring suspension unit having a plurality of active coils, at least one of which is attached to a carrier for a magnet to move the carrier an amount proportional to relative movement between sprung and unsprung vehicle masses interconnected by the air spring unit, and to further employ a Hall effect device external of the air spring suspension unit to sense relative movement of the sprung and unsprung vehicle masses by sensing movement of the flux field of the magnet.

These and other features, objects and advantages of this invention will be more apparent from the following detailed description and drawing in which:

FIG. 3 is a cross-sectional view taken along lines 3—3 of FIG. 2 illustrating the height sensing unit of this invention;

FIG. 4 is a perspective view of a portion of the height sensing unit of FIGS. 2 and 3;

FIG. 5 is a planned view of a magnetic field generated by internal magnets disposed within the pneumatic envelope of FIG. 2.

Figure 1:
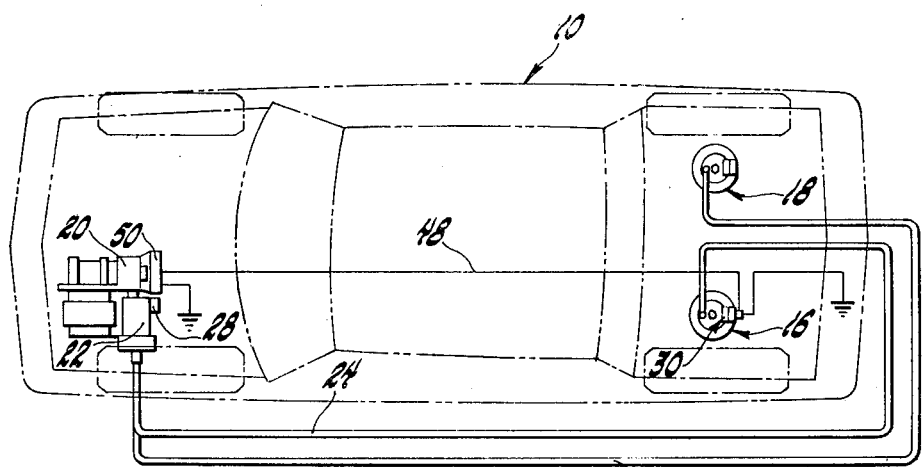
FIG. 1 is a diagrammatic planned view of a wheeled motor vehicle with air spring unit providing the rear suspension therefore.
Figure 2:
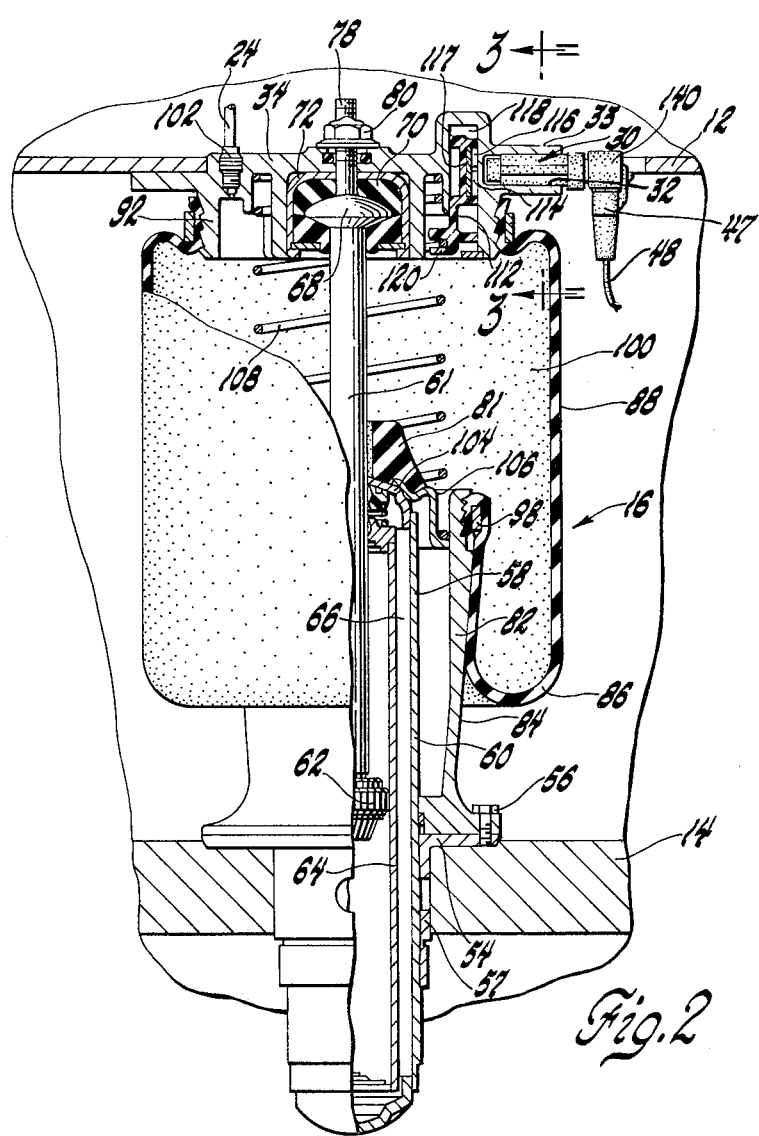
FIG. 2 is an elevational view partially in section of one of the air spring units of FIG. 1 according to this invention.

Turning now in greater detail to the drawing there is illustrated by FIGS. 1 and 2 an automotive vehicle 10 having sprung and unsprung masses 12 and 14, operatively connected by a pair of air spring units 16 and 18. The air spring units are preferably disposed at the rear of the vehicle and between the vehicle frame and axle. These units are supplied with pressurized air from an electrically driven compressor 20 through an air drier 22 and separate air lines 24 and 26. When pressurized air is supplied to these units, the volume of each air column confined within each unit is increased so that the vertical distance between the sprung and unsprung masses of the vehicle is accordingly increased. Solenoid controlled exhaust valve means 28 are incorporated with the compressor 20 and air drier 22 for exhausting pressure air from the air spring units 16 and 18 to decrease air column volume and thereby the distance between the sprung and unsprung masses of the vehicle to reduce vehicle curb height.

A height sensing probe assembly 30 is operatively mounted in a cylindrical bore 32 formed in an extension 33 of an aluminum cover 34 which provides the upper end of air spring unit 16. This height sensing probe assembly has a cylindrical shaft portion 36 of a suitable plastic material which extends inwardly through a split retainer sleeve 38 also of plastic and which terminates in an enlarged head portion 40 forms the inboard end thereof. Embedded in the head portion 40 and adjacent to the inner face thereof is a Hall effect device 42 connected by conductors 46 through connectors 45 and 47 and multiplex signal wire 48 to a height sensing electronic module 50 mounted on the compressor 20. This module, operatively connected to the electrical system of the vehicle, has logic triggered by the Hall effect device which accordingly controls the compressor 20 and the solenoid operated exhaust valve 28. U.S. Pat. No. 4,310,172 for Position Control System filed Apr. 23, 1979 by George T. Claude and Jerry W. Burns and assigned to the assignee of this invention discloses a module, compressor and an exhaust valve construction which are suitable for employment in the preferred construction of this invention and is hereby incorporated by reference.

In one preferred embodiment of this invention the probe assembly 30 provides a height information sending unit governing both air springs located on the cover of air spring unit 16 while the electronic module 50 is remotely located on the compressor 20. With the exception of the height sensing components of air spring 16, both air spring units are essentially the same so that only air spring unit 16 is shown and described in detail. The air spring unit 16 has a mounting plate 54 adjacent the lower end thereof that is secured by fastener means 56 to the unsprung mass of vehicle 10. The mounting plate has a central cylindrical sleeve portion 57 which accommodates a double acting hydraulic shock absorber 58 suitably secured therein that may be similar to that disclosed in U.S. Pat. No. 3,203,511 to P. G. Long, Jr. hereby incorporated by reference.

The shock absorber 58 has an axially extending elongated cylindrical reservoir tube 60 which is secured to the sleeve portion 57 of the mounting plate and which extends axially into unit 16. A cylindrical piston rod 61 and piston 62, secured to the lower end of the rod, are reciprocally movable in an oil filled cylinder tube 64 concentrically mounted within the reservoir tube 60. A fluid reservoir 66, provided by the concentrically mounted reservoir and cylinder tubes, accommodates the hydraulic fluid from the cylinder tube 64 on compression stroke and supplies make up oil when the shock absorber extends during rebound. The piston rod 61 has an enlarged upper head portion 68 that is secured by polymeric mount 70 in a cup like retainer 72 mounted in air spring cover 34. The upper end 78 of the piston rod 61 extends from head portion 68 through cover 34 and is secured to the cover by a nut 80 threaded onto the end of the piston rod. Elastomer element 81 mounted on the top of the shock absorber is a yieldable compression bump stop engageable with the lower side of cover 34 when the shock absorber is fully telescoped.

With this shock absorber construction, relative movement of the unsprung and sprung masses of the vehicle toward and away from one another results in the reciprocating movement of the piston and the piston rod in the oil filled cylinder tube for appropriate damping of the oscillatory action of the vehicle suspension spring units 16 and 18.

As best shown in FIG. 2 the pneumatic air suspension spring 16 has a fixed lower piston 82 disposed concentrically about the upper half of the cylinder tube and the reservoir tube of the shock absorber. The fixed piston is a generally cylindrical member with a varying diameter to form a profiled outer surface 84 which cooperates with a rolling lobe 86 of a pneumatic sleeve 88, formed from a suitable polymeric material reinforced with a suitable fabric, to provide a variable rate air spring. The upper end of sleeve 88 is attached by a constrictable band to a downwardly depending cylindrical portion 92 of cover 34. The sleeve 88 has a fixed outer diameter and the lobe 86 rolls over the profile of the fixed piston as the vehicle sprung and unsprung masses move toward and away from one another as may occur in any driving operation of vehicle 10. A constrictable band 98 secures the lower end of sleeve 88 to the upper end of the fixed piston 82 in an air tight manner.

The sleeve 88 in conjunction with the upper cover 34 and the fixed piston 82 form a pneumatic chamber 100 which is supplied with air through line 24 that is coupled into the cover by fitting 102. Secured to the compression bump stop 104 of the shock absorber 58 is a cup like spring retainer 106 of sheet metal that fits into the upper end of the fixed piston 82. A helical spring 108 has its lower end seated in the spring retainer 106 and spirals upwardly therefrom into engagement with the underside of cover 34 as shown in FIG. 2.

This spring having a predetermined number of active coils will proportionally reflect the actual distance of relative movement occurring between the unsprung and sprung masses of the vehicle. For example, if spring 108 has five active coils, each coil will move one-fifth of the actual relative distance moved by the sprung and unsprung masses. This reduction makes the spring suitable for connection with a movable carrier 112. The carrier supports a pair of permanent magnets 114 and 116 mounted on a flat piece of self magnetic steel 117 and is guided for vertical sliding movement in a recessed track 118 formed within the cover plate 34. As shown carrier 112 has a bifurcated foot portion 120 which receives one of the coils of spring 108 and moves what that coil in response to relative movement of the sprung and unsprung masses.

FIG. 5 diagrammatically illustrates magnets 114 and 116 as being mounted on the soft magnetic steel backing member 117 and separated by an air gap 119 so that the field F generated by the magnets 114 and 116 is increased in flux density. This field which extends through the aluminum cover 34 is sensed by the Hall effect device 42 which, depending upon its position in the field F, produces an output which activates the logic of the module. If the vehicle curb height is low and the Hall effect device is moved beyond the lower limit of a predetermined dead band or null zone width, the compressor will be activated by the logic of the electronic module 50 until the curb height is returned to trim and the Hall effect device is centered in the dead band. If the vehicle curb height is high and the Hall effect device is moved beyond the upper limits of the dead band, the exhaust valve 28 will be activated by the module to reduce air column volume in the air springs 16 and 18 so that the Hall effect device is returned to the center of the dead band and the vehicle lowers into trim. If the vehicle is in trim, the compressor and exhaust valve are maintained in an "off" position so that the trim height is maintained.

As shown by FIG. 4, the sleeve 38 of the height sensing probe assembly 30 is longitudinally split along its side as indicated by numeral 121 and is formed with a pair of ears 122 on opposite sides of the split 121 which receive threaded fastener 124. By threadedly advancing this fastener into the ears 122, the sleeve 38 can be constricted to tightly grip the cylindrical shaft 36 of the probe assembly to thereby hold the shaft in a rotatably adjusted position to fix the bumper height in a vertically adjusted position as will be hereinafter described.

The plastic sleeve 38 has an elongated key 126 diametrically opposed to split 121 which slidably fits into an elongated key way 128 extending laterally of the bore 32 formed in extension 33 of the cover. This extension has an elongated vertical opening 132 (FIG. 3) that communicates with the upper face of the key. With this construction the probe assembly 30, as formed by the sleeve and the cylindrical shaft, can be adjusted inwardly or outwardly to adjust dead band width. Once a particular dead band width is selected, the vertical opening 132 provides access so that the key can be upset or deformed by ultrasonic or other means into the recess 134 formed in the key way 128 to thereby secure the probe assembly in a selected axially adjusted position. This positions the Hall effect device 42 at a predetermined distance from the magnets 114 and 116 and axially fixes the Hall effect device within the magnetic field of these magnets for subsequent rotational adjustment if desired as will be further explained below.

The Hall effect device 42 as shown by FIG. 3 and 4 is preferably radially located a predetermined distance with respect to the center 138 of the shaft 36 of the cylindrical probe assembly 30. With the sleeve 38 released from gripping engagement with the shaft 36, the waterproof connector 140 attached to the outboard end of the shaft can be manually gripped and rotated to rotate the shaft and the Hall effect device relative to the magnetic field to thereby raise or lower bumper height. By rotating shaft 36 in one direction the Hall effect device will be moved lower into the south field to thereby lower the bumper height. After the rotational adjustment, the shaft 36 is secured in a fixed rotational position by appropriate advancement of the threaded fastener 124 so that sleeve 38 grips shaft 36 to thereby insure that the adjusted position is not lost.

The Hall effect device 42 is sensitive to the perpendicular component of a magnetic flux field such as the flux field F generated by the carrier supported bipolar magnets 114 and 116 and is selected to produce an output when the magnitude of the flux density is at a predetermined minimal level. For example, the Hall effect device may be set to trigger at 300 Gauss in the north or south fields of the bipolar magnets of FIG. 5. When the Hall effect device is positioned at a point A along the axis X of FIG. 5 a predetermined distance D from the surface of the magnets, a predetermined dead band width W having upper and lower limits B and C is established. Point B is established by relative movement of the Hall effect device and the north magnetic field until flux density of 300 Gauss normal to the device causes the device to provide an output. Point C is similarly established on relative movement of the Hall effect device into the south magnetic field. If increased vehicle load on the vehicle moves the Hall device vertically downwardly relative to the south field beyond Point C, the Hall effect device will be triggered to provide an output so that the electronic sensor unit will effect operation of the compressor 20 to supply a volume of pressurized air to the air spring units to raise the sprung mass of the vehicle relative to the unsprung mass until the Hall device is again centered in the dead band zone W. Conversely, if the vehicle load is reduced to an extent such that the Hall effect device is moved by spring 108 from the dead band zone beyond Point B in the field, the Hall effect device sensing a flux density of greater than 300 Gauss would provide an output effecting the electronic module which responds by opening the exhaust valve so that a limited quantity of pressurized air volume would be removed from the air spring units. The air column volume in these springs is accordingly reduced until the Hall effect device is again centered in the dead band zone W.

It will be appreciated that as the Hall effect device is moved toward the magnets, the width of the dead band will be reduced. Conversely, by moving the Hall effect device away from the face of the magnets, the width of the dead band is accordingly increased. For example, when the Hall effect device 42 is moved from Point A to Point A' on the X axis, the width of the dead band will be reduced to the distance between Points B' and C' which are points at which the Hall effect device intersects the 300 Gauss flux density lines.

Bumper height can be adjusted by rotating the cylindrical component of the probe assembly to position the Hall effect device to either side of the perceived center of the magnetic flux field. By turning the shaft 36 of the probe assembly in a first direction, the Hall effect device may, for example, be moved relative to the magnetic field from Point A towards Point B. As soon as the Hall effect device reaches Point B, the electronic module will trigger compressor operation to raise bumper height until the Hall effect device is centered in the magnetic field. Starting again at point A and by rotating, the Hall effect device will move in an opposite direction. As soon as the Hall effect device passes Point C, the device will provide an output so that the electronic module will cause the exhaust valve to operate to lower the bumper height of the vehicle.

If the Hall effect device is moved closer to the face of the magnets to decrease dead band width, it will be apparent that the amount of rotation to effect raising or lowering of the bumper height will be reduced. Conversely, as the Hall effect device is positioned axially away from the face of the bipolar magnets, increased rotation will be required to effect adjustment of bumper height.

In the preferred embodiment of the invention a single Hall effect device is employed which is responsive to both the north and south magnetic fields. If desired, two Hall effect devices can be employed, one being activated by the north field and the other being activated by the south field. With the Hall effect device as employed in this invention, an air spring unit pressure boundary can be crossed without the physical penetration of this boundary. Importantly, in this invention the use of seals to maintain the high pressure area is reduced.

While a preferred embodiment of the invention has been shown and described to illustrate the invention, other modifications will become apparent to those skilled in the art. Accordingly, the scope of this invention is set forth in the following claims.

The embodiments of the invention in which an exclusive property or privilege is claimed are defined as follows:

1. A leveling system for a vehicle having sprung and unsprung masses comprising a source of gas pressure, gas spring suspension means operatively connected to said source of gas pressure and yieldably interconnecting said sprung and unsprung masses, said gas spring suspension means having polymeric cylindrical sleeve means providing variable volume gas column between said sprung and unsprung masses of said vehicle, exhaust valve means operatively connected to said gas column operable to exhaust pressurized gas therefrom, magnetic means movably mounted within said sleeve means and operatively connected to one of said masses for indicating the relative position of said sprung and unsprung masses, and a Hall effect device adjustably positioned on said gas spring suspension means externally of said sleeve, control means operatively connected to said Hall effect device and to said source of gas pressure and further to said exhaust valve means and responding to output from said Hall effect device as triggered by the flux field of said magnetic means for controlling the spacing between said masses, axially movable mounting means for axially positioning said Hall effect device at a selected adjusted position adjacent the face of said magnet means and within the flux field thereof to thereby establish a dead band zone having a width in which the Hall effect device effects maintenance of said gas pressure in said column by maintaining said exhaust valve means in a closed position and ensuring that said gas spring volume is closed with respect to said source.

2. A leveling system for a vehicle having sprung and unsprung masses comprising a source of gas pressure, gas spring suspension means operatively connected to said source of gas pressure and yieldably interconnecting said sprung and unsprung masses, said gas spring suspension means having polymeric cylindrical sleeve means and a closure cap means providing an envelope for a variable volume gas column operatively disposed between said sprung and unsprung masses of said vehicle, exhaust valve means operatively connected to said gas column operable to exhaust pressurized gas therefrom, magnetic means movably mounted in said cap means and within said suspension means and operatively connected to one of said masses to produce a movable flux field only at one end of said gas spring suspension means for indicating the relative position of said sprung and unsprung masses, and a solitary Hall effect device positioned in said cap means and at one end of said gas spring suspension means externally of said sleeve for reciprocating movement relative to said magnetic means and only within the confines of said flux field, control means operatively connected to said Hall effect device and to said source of gas pressure and further to said exhaust valve means and responding to output from said Hall effect device as triggered by the flux field of said magnetic means for controlling the spacing between said masses, adjustable mounting means for axially positioning said Hall effect device at a selected position adjacent the face of said magnet means and within the flux field thereof to thereby establish a dead band zone having a width in which the Hall effect device effects maintenance of said gas pressure in said column by maintaining said exhaust valve means in a closed position and ensuring that said gas spring volume is closed with respect to said source.

3. A leveling system for a vehicle having sprung and unsprung masses comprising a source of pressurized gas, gas spring suspension means operatively connected to said source of pressurized gas and yieldably interconnecting said sprung and unsprung masses, said gas spring suspension means having polymeric cylindrical sleeve means providing a variable volume gas column between said sprung and unsprung masses of said vehicle, exhaust valve means operatively connected to said gas column operable to exhaust pressurized gas therefrom, magnetic means operatively connected to one of said masses and supported for movement within the said confines of said suspension means to produce a flux field for indicating the relative position of said sprung and unsprung masses, and a single Hall effect device positioned on said gas spring suspension means externally of and at one end of said sleeve for reciprocating movement bounded by said flux field, control means operatively connected to said Hall effect device and to said source of gas pressure and to said exhaust valve means and responding to outputs from said Hall effect device as triggered by the flux field of said magnetic means for controlling the spacing between said masses, adjustable probe means mounting said Hall effect device for linear and transverse movement with respect to said magnetic means so that said Hall effect device can be moved to a selected axial position adjacent the face of said magnetic means and within the flux field thereof to thereby establish a dead band zone having a width in which the Hall effect device effects maintenance of said pressure in said column by maintaining said exhaust valve means in a closed position and ensuring that said gas spring volume is closed with respect to said source and means rotatably mounting said Hall effect device for movement relative to the flux field of said magnets to permit said Hall effect device to cause a change in the trim height of said vehicle.

4. In a leveling system for a vehicle having sprung and unsprung masses, gas spring means having a rolling lobe polymeric cylindrical sleeve adjustably interconnecting said sprung and unsprung masses, said sleeve defining a chamber for receiving a pressurized gas to thereby provide a spring resiliently mounting said sprung mass over said unsprung mass, control means for supplying gas to said chamber to increase the gas volume therein to elongate the same to increase the distance between said sprung and unsprung masses, said control means incorporating gas pressure exhaust means for exhausting pressurized gas from said chamber to decrease the length of said chamber and thereby the distance between said sprung and unsprung masses, magnetic means reciprocally movable within said gas chamber providing a movable magnetic field which extends externally of said gas chamber, carrier means mounting said magnetic means for movement in a predetermined path within the limits of said gas chamber, connector means operatively connecting said carrier to at least one of said masses so that said carrier and said magnetic means move in said path distances proportional to the relative movement of said masses, a single Hall effect device disposed for movement only within said flux field externally of said chamber for sensing movement of said magnetic means and for triggering said controls to effect supply of pressurized gas to said chamber when said masses are disposed at a predetermined minimal distance from another and also for exhausting pressurized gas from said chamber when said masses are disposed at a predetermined maximum distance from one another, said Hall effect device providing a dead band permitting limited relative movement of said masses between said minimal and maximum distances without triggering said sensor means, and probe assembly means adjustably mounting said Hall effect device externally of and at one end of said gas spring means for transverse movement in said magnetic field toward and away from said magnetic means to thereby adjust the width of said dead band to a selected dead band width.

5. A control system for adjusting the relative positions of two relatively movable members comprising pneumatic air spring means operatively interconnecting said members for movement toward and away from one another, helical spring means operatively connected between said members and having an active coil movable by an amount proportional to the relative movement of said members, follower means operatively connected to one of said coils of said helical spring means, means mounting said follower means internally of said pneumatic air spring means, magnetic means mounted on said follower means for producing a solitary movable magnetic field which extends through said air spring means, a single Hall effect device adjustably supported externally of said pneumatic air spring means for full time operation only within said flux field, control means responsive to the output of said Hall effect device to produce electrical signals, means operatively connected to said control means for activating said pneumatic air spring means to move said masses away from one another in response to the positioning of said magnetic means at a first position with respect to said Hall effect device and to further effect movement of said masses toward one another in response to the positioning of said magnetic means at a second position with respect to said Hall effect device.

6. A leveling system for adjusting the relative position of relatively movable sprung and unsprung members of a vehicle comprising gas spring means operatively interconnecting said members for movement toward and away from one another, reciprocably movable follower means operatively connected to one of said members and movably therewith relative to the other of said members by an amount proportional to the relative movement of said members, mounting means operatively holding said follower means internally of said gas spring means, first and second magnets mounted on said follower means for movement therewith for producing adjacent north and south magnetic flux fields which move with said follower means, a single Hall effect device mounted externally of said gas spring and normally stationed at an adjusted centralized location intermediate said north and south magnetic fields, said Hall device being operative to provide an output signal subsequent to predetermined relative movement in said flux fields by a predetermined magnetic flux density thereof and control means operatively connected to and responsive to the output of said Hall effect device for activating said gas spring means to move said members away from one another in response to the positioning of said magnetic fields at a first position with respect to said Hall effect device and to effect movement of said members toward one another in response to the position of said magnetic fields at a second position with respect to said Hall effect device.

7. A trim height and leveling system for a vehicle having sprung and unsprung mass portions comprising gas pressure establishing means for said system, said pressure establishing means comprising a source of gas pressure and exhaust valve means, gas spring suspension means operatively connected to said pressure establishing means and interconnecting said sprung and unsprung mass portions to one another, said gas spring means having first attachment ments connected to said unsprung mass portion and second attachment means connected to said sprung mass portion, rolling lobe sleeve means adjustably interconnecting said first and second attachment means and providing a variable volume gas chamber between said sprung and unsprung portions of said vehicle and charged with gas pressure for varying the distance therebetween, magnet means movable in accordance with the relative position of said sprung and unsprung portions of said vehicle and confined within said sleeve to produce a predetermined field of flux, and a solitary Hall effect device mounted on said first attachment means externally of said gas chamber for full time operation within said flux field and responsive to the density of said magnetic flux field outside of said gas chamber and operatively connected to said source for sensing the position of said magnet means and for activating said gas pressure establishing means to thereby control the relative position of said sprung and unsprung portions of said vehicle, and helical spring means operatively connected between said mass portions for operatively supporting said magnet means for movement proportional to the relative movement of said mass portions, and adjustment means for axially moving said Hall effect device transversely with respect to said magnetic means within said magnetic field to establish a null zone of predetermined width therein to establish vehicle trim height.

* * * * *